US008139136B2

(12) United States Patent
Iwamoto

(10) Patent No.: US 8,139,136 B2
(45) Date of Patent: Mar. 20, 2012

(54) IMAGE PICKUP APPARATUS, CONTROL METHOD OF IMAGE PICKUP APPARATUS AND IMAGE PICKUP APPARATUS HAVING FUNCTION TO DETECT SPECIFIC SUBJECT

(75) Inventor: Kenji Iwamoto, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 245 days.

(21) Appl. No.: 12/486,317

(22) Filed: Jun. 17, 2009

(65) Prior Publication Data
US 2009/0316016 A1 Dec. 24, 2009

(30) Foreign Application Priority Data

Jun. 24, 2008 (JP) ................................ 2008-163934

(51) Int. Cl.
*H04N 5/222* (2006.01)
(52) U.S. Cl. .................................................. 348/333.02
(58) Field of Classification Search ............. 348/333.02, 348/333.12
See application file for complete search history.

(56) References Cited

U.S. PATENT DOCUMENTS

| 7,864,228 B2 * | 1/2011 | Mori et al. ............... 348/240.99 |
| 2005/0270399 A1 | 12/2005 | Kawaguchi et al. |
| 2008/0094478 A1 * | 4/2008 | Sato ........................ 348/208.12 |
| 2008/0279427 A1 * | 11/2008 | Takagi ......................... 382/118 |

FOREIGN PATENT DOCUMENTS

| JP | 2005-348181 A | 12/2005 |
| JP | 2006-0092191 A | 4/2006 |

* cited by examiner

*Primary Examiner* — Albert Cutler
(74) *Attorney, Agent, or Firm* — Holtz, Holtz, Goodman & Chick, PC

(57) ABSTRACT

Disclosed is an image pickup apparatus 100 including an image display section 32 to identify and display a face which is detected in an image frame, an operation section 4 having cursor buttons of up, down, left and right and a set button which are respectively corresponded with a plurality of areas which divide the image frame and a CPU 71 to switch the area in the image frame which is to be a target for face detection based on pressing of any of the buttons by a user. According to the image pickup apparatus 100, the targeted area for face detection can be changed promptly while confirming the condition in which the face is detected in the image frame.

10 Claims, 13 Drawing Sheets

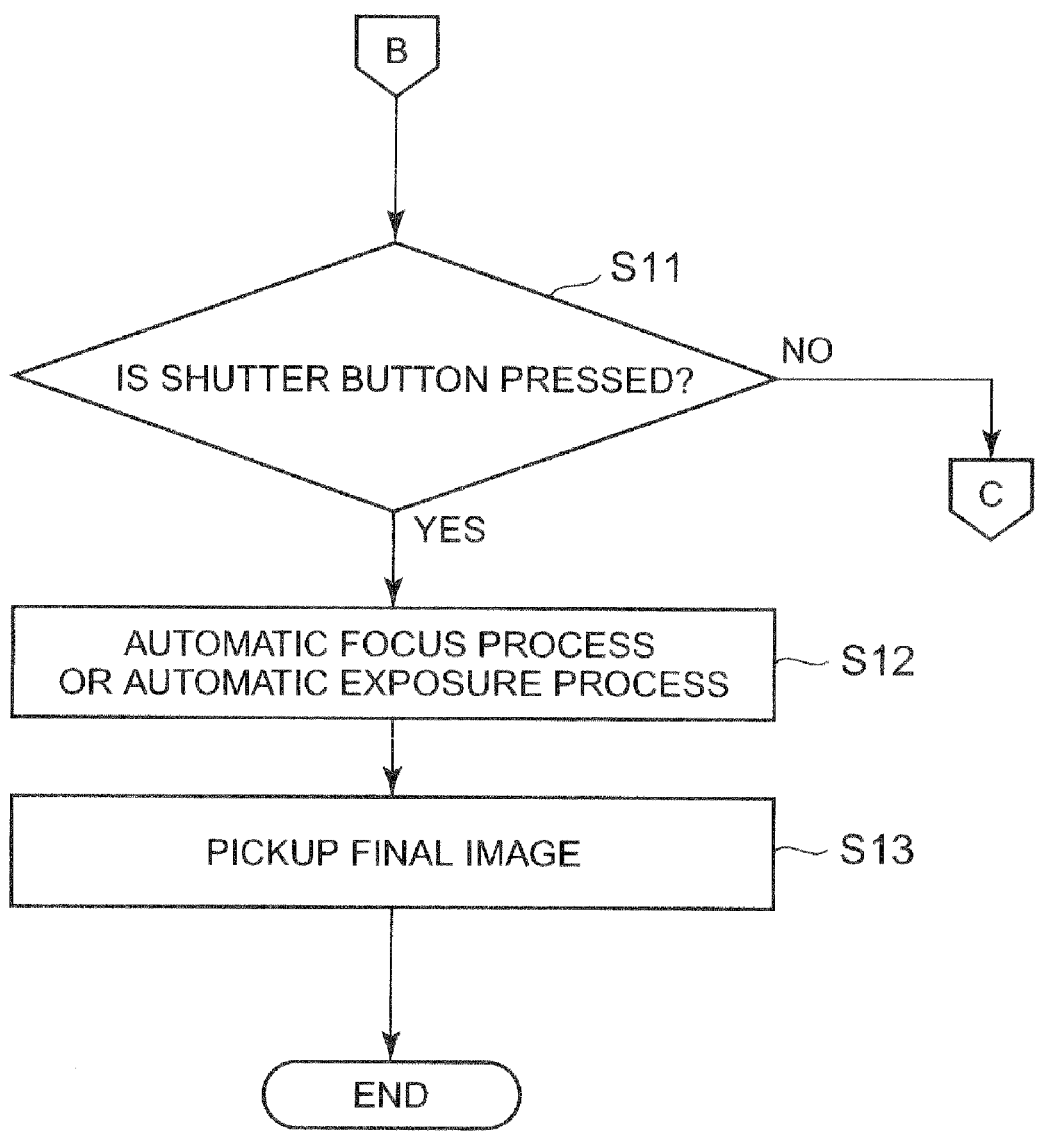

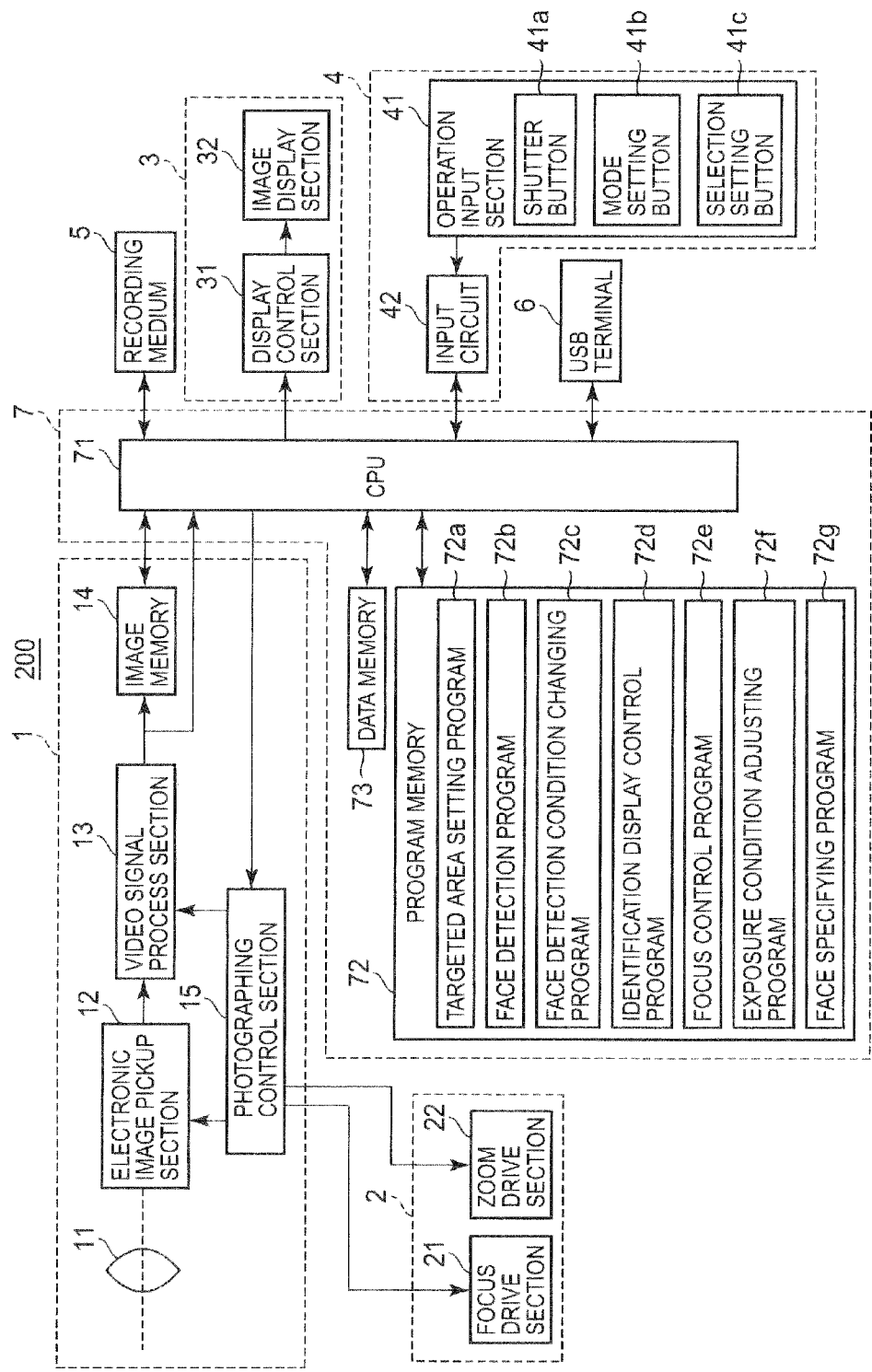

US 8,139,136 B2

IMAGE PICKUP APPARATUS, CONTROL METHOD OF IMAGE PICKUP APPARATUS AND IMAGE PICKUP APPARATUS HAVING FUNCTION TO DETECT SPECIFIC SUBJECT

BACKGROUND OF THE INVENTION

1. Field of the Invention

The present invention relates to an image pickup apparatus having a function to detect a specific subject and to a control method of the image pickup apparatus.

2. Description of the Related Art

Conventionally, there is known a digital camera which comprises a function to detect a face in an image frame and to set the detected face as a target for the auto-focus (AF) and the automatic exposure (AE).

With regards to such camera, a technique of automatically changing the targeted area for face detection when the face detection is repeated (for example, JP2006-92191) and a technique where a user can arbitrarily set the position and the size of the targeted area for face detection (for example, JP2005-348181) are known.

In the above related arts, the position and the size of the targeted area for face detection can be arbitrarily set by a user. However, the targeted area for face detection cannot be changed promptly in real time while the photographer confirming the condition in which the face is detected in the photographed image.

SUMMARY OF THE INVENTION

Therefore, an object of the present invention is to provide an image pickup apparatus in which a targeted area for the detection process can be promptly changed while confirming the condition in which a specific subject (for example, face of a person) is detected in an image frame and to provide a control method of the image pickup apparatus.

In one aspect of the present invention, an image pickup apparatus having a detecting function of a specific subject comprises an image pickup unit, a display unit to display an image frame which is repeatedly picked up by the image pickup unit while sequentially updating the image frame, a detection unit to detect the specific subject in any of a plurality of areas which divide the image frame, an identification display unit to identify and display the specific subject which is detected by the detection unit in the image frame displayed in the display unit, an instruction operation unit to receive a plurality of instruction operations which are different from each other and which are corresponded with each of the plurality of areas which divide the image frame and a switching unit to switch an area which is to be a detection target for the detection unit so as to be an area corresponded with an instruction operation which is received when any of the instruction operations is received by the instruction operation unit.

In another aspect of the present invention, a control method of an image pickup apparatus having a detecting function of a specific subject comprises displaying an image frame which is repeatedly picked up by an image pickup unit while sequentially updating the image frame, detecting the specific subject in any of a plurality of areas which divide the image frame, identifying and displaying the specific subject which is detected in the detecting in the image frame displayed by the displaying and switching an area which is to be a detection target of the specific subject so as to be an area corresponded with an instruction operation which is received when any of instruction operations is received by an instruction operation unit which receives a plurality of instruction operations which are different from each other and which are corresponded with each of the plurality of areas which divide the image frame.

BRIEF DESCRIPTION OF THE DRAWINGS

FIG. 11 is a flowchart showing a continuation of the image pickup process shown in FIG. 10.

FIG. 12 is a block diagram showing a schematic structure of an image pickup apparatus of a modification example 1.

DETAILED DESCRIPTION OF THE PREFERRED EMBODIMENTS

Figure 1:
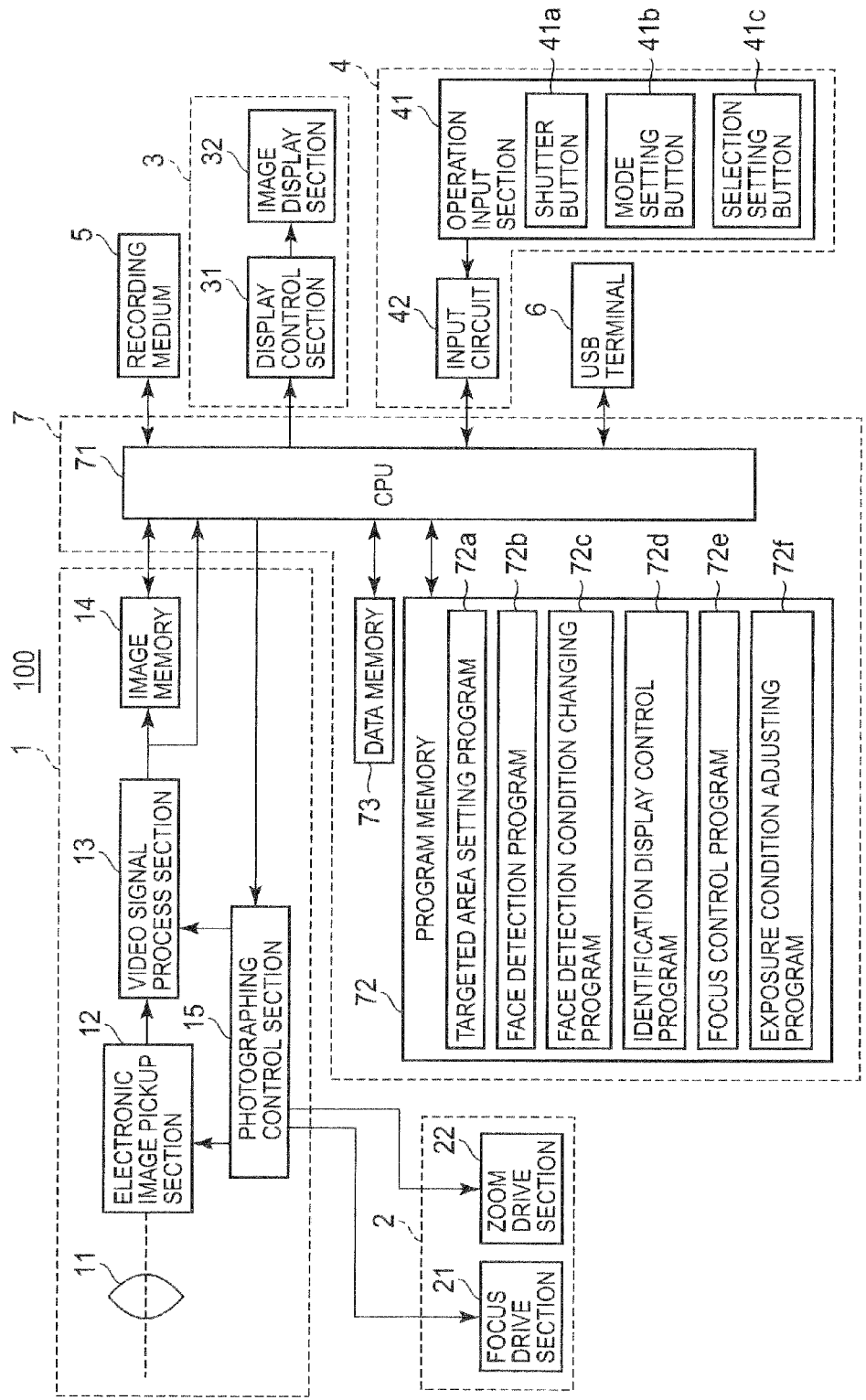
FIG. 1 is a block diagram showing a schematic structure of an image pickup apparatus of an embodiment applying the present invention.

Hereinafter, specific embodiments of the present invention will be described with reference to the drawings. However, the scope of the invention is not limited to the examples shown in the drawings.

FIG. 1 is a block diagram showing a schematic structure of an image pickup apparatus 100 of an embodiment applying the present invention. Further, FIG. 2 is a back view showing the image pickup apparatus 100.

In a face detection process, the image pickup apparatus 100 of the embodiment selects a targeted area R which is to he the target for the face detection among five areas R1, R2, R3, R4 and R5 which are formed by dividing the image frame G in five. This selecting of the targeted area R is carried out based on operation of cursor buttons c2, c3, c4 and c5 and a set button c1 of the operation section 4. Further, every time any one of the buttons is operated, the area which is corresponded with the operated button is sequentially set as the targeted area R which is to be the target for the face detection. Furthermore, based on the continuous operation of a same button among the cursor buttons c2, c3, c4 and c5 and the set button c1, a condition for the face detection carried out in the face detection process is changed.

Figure 2:
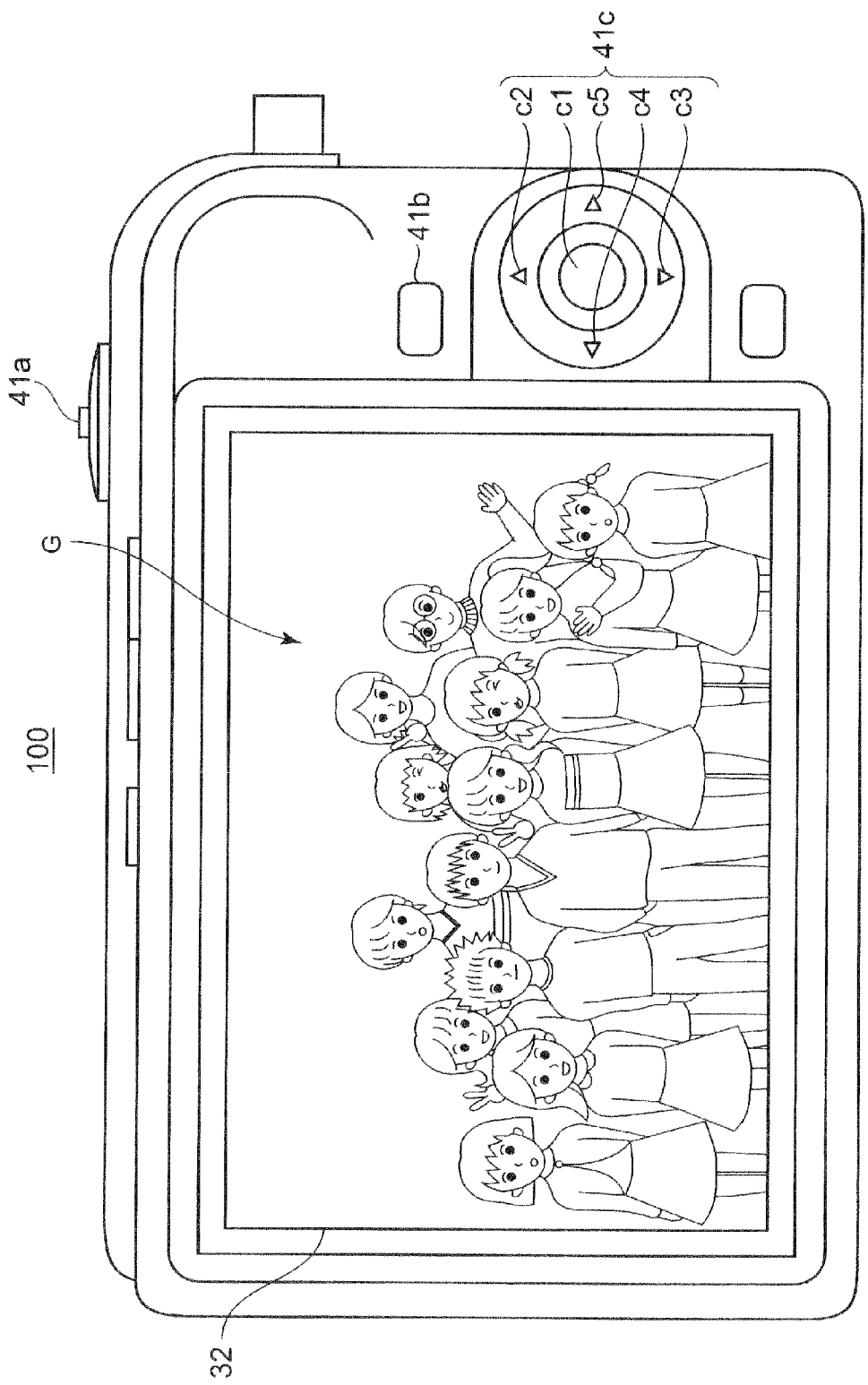
FIG. 2 is a back view showing the image pickup apparatus of FIG. 1.

In particular, as shown in FIGS. 1 and 2, the image pickup apparatus 100 comprises an image pickup section 1, an image pickup assisting section 2, a display section 3, the operation section 4, a recording medium 5, a USB terminal 6, a control section 7 and the like.

As an image pickup unit, the image pickup section 1 continuously picks up images of a subject to generate a plurality of image frames G. In particular, the image pickup section 1 comprises an image pickup lens 11, an electronic image pickup section 12, a video signal process section 13, an image memory 14, a photographing control section 15 and the like.

The image pickup lens 11 is constituted with a plurality of lenses.

The electronic image pickup section 12 comprises the CCD (Charge Coupled Device), the CMOS (Complementary Metal-oxide Semiconductor) or the like to convert the subject image which passed through the image pickup lens 11 to a two dimensional image signal.

The video signal process section 13 carries out a predetermined image process to the image signal outputted from the electronic image pickup section 12.

The image memory 14 temporarily stores the image signal after the image process after the image process is carried out.

The photographing control section 15 controls the electronic image pickup section 12 and the video signal process section 13 under the control of the CPU 71. In particular, the photographing control section 15 controls so as to make the electronic image pickup section 12 pickup an image of the subject in a predetermined exposure time and so as to execute the reading process of an image signal (image frame G) from an image pickup area of the electronic image pickup section 12 at a predetermined frame rate.

The image pickup assisting section 2 is to be driven at the time of the image pickup of the subject by the image pickup section 1, and the image pickup assisting section 2 comprises a focus drive section 21, a zoom drive section 22 and the like The focus drive section 21 drives the focus mechanism section (omitted from the drawing) which is connected to the image pickup lens 11.

The zoom drive section 22 drives the zoom mechanism section (omitted from the drawing) which is connected to the image pickup lens 11.

Here, the focus drive section 21 and the zoom drive section 22 are connected to the photographing control section 15 and are driven under the control of the photographing control section 15.

As a display unit, the display section 3 displays the image frame G which is to be repeatedly picked up by the image pickup section 1 while sequentially updating the image frame G. Further, the display section 3 is arranged so as to expose the display screen from the back side of the image pickup apparatus 100 (see FIG. 2 and the like).

Furthermore, the display section 3 comprises a display control section 31, an image display section 32 and the like.

The display control section 31 comprises a video memory (omitted from the drawing) which temporarily stored the display data arbitrarily outputted from the CPU 71.

Figure 3:
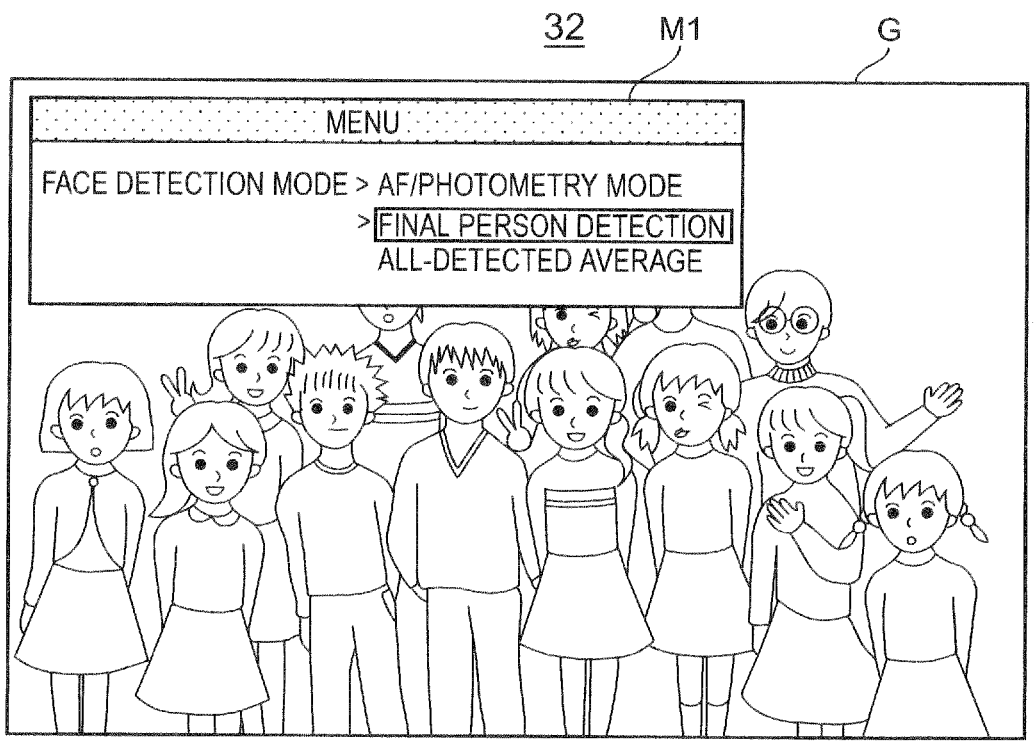
FIG. 3 is a diagram schematically showing an example of a standard face selecting menu screen shown in an image display section of the image pickup apparatus of FIG. 1.

The image display section 32 superimposes the standard face selecting menu screen M1 (see FIG. 3) on the image frame G based on the output signal from the display control section 31 to carry out the OSD display of the standard face selecting menu screen M1.

The standard face selecting menu screen M1 is a screen for selecting either of the face which is detected finally in the face detection process (final person detection) or all of the detected faces (all-detected average) is to be the standard face for the automatic focusing process (AF) and the automatic exposure process (AE).

Here, when the all-detected average is selected and decided, the average of all of the detected faces is obtained so that all of the detected faces will be optimized for AE and AF.

Further, the image display section 32 displays a predetermined image such as the image picked up by the image pickup section 1 (see FIG. 4B and the like) in the display screen. At this time, the image display section 32 displays the targeted area dividing line L which divides the five areas R1, R2, R3, R4 and R5 which are respectively corresponded with the cursor buttons c2, c3, c4 and c5 and the set button c1 on the display screen (see FIGS. 4A and 4B).

Figure 4A:
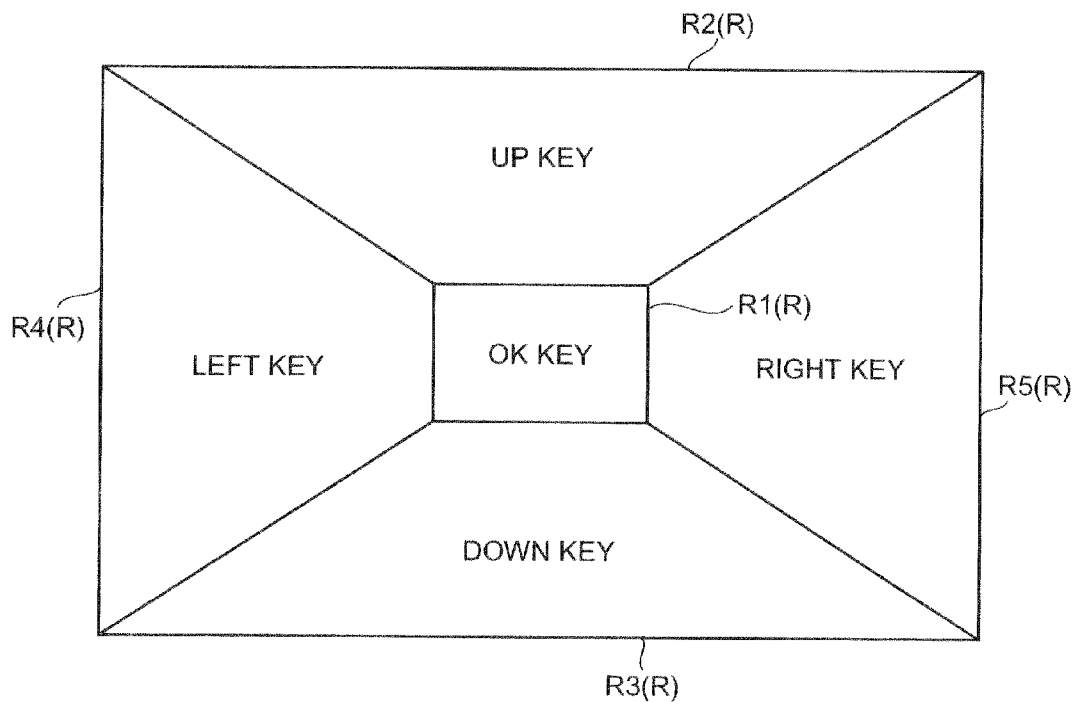
FIGS. 4A and 4B are diagrams for explaining targeted areas of an image to be displayed in the image display section of the image pickup apparatus of FIG. 1.
Figure 4B:
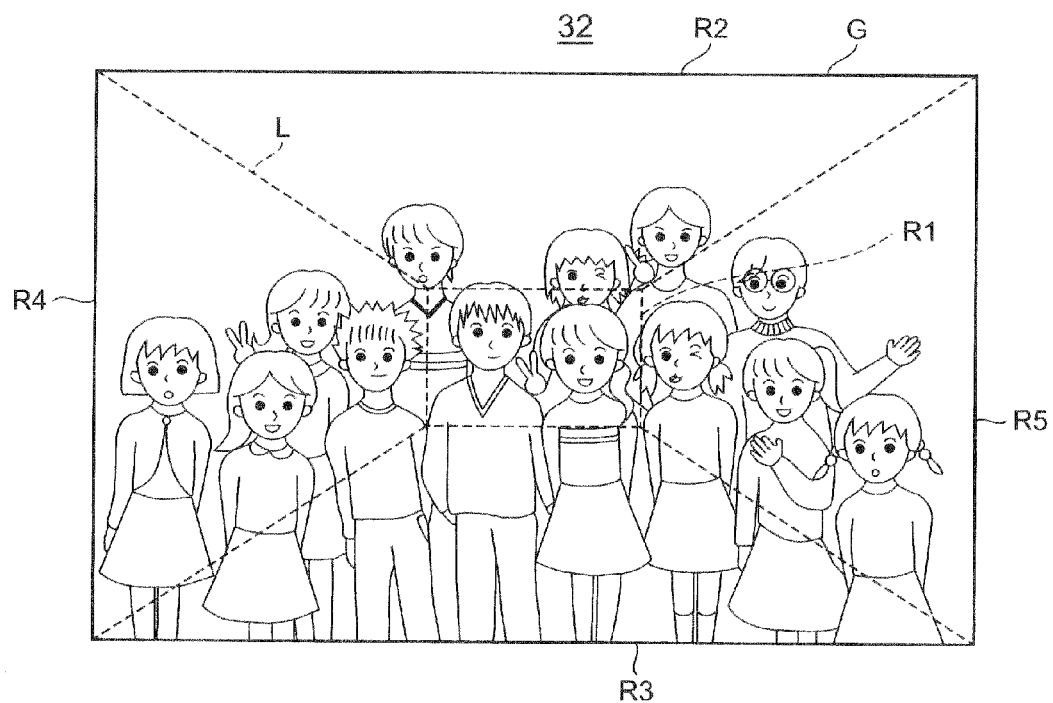

The targeted area dividing line L is displayed by being superimposed on the image frame G. In particular, as shown in FIGS. 4A and 4E, an approximate rectangular center area R1 is sectioned by a rectangular frame which is positioned approximately at the center of the image frame G, and the upper area R2, the lower area R3, the left area R4 and the right area R5 are sectioned by the four lines which connect each of the vertexes of the image frame G and each of the vertexes of the rectangular frame.

The center area R1 is corresponded with the set button c1, the upper area R2 is positioned at the upper side of the center area R1 and is corresponded with the up cursor button c2, the lower area R3 is positioned at the lower side of the center area R1 and is corresponded with the down cursor button c3, the left area R4 is positioned at the left side of the center area R1 and is corresponded with the left cursor button c4 and the right area R5 positioned at the right side of the center area R1 and is corresponded with the right cursor button c5.

Figure 5:
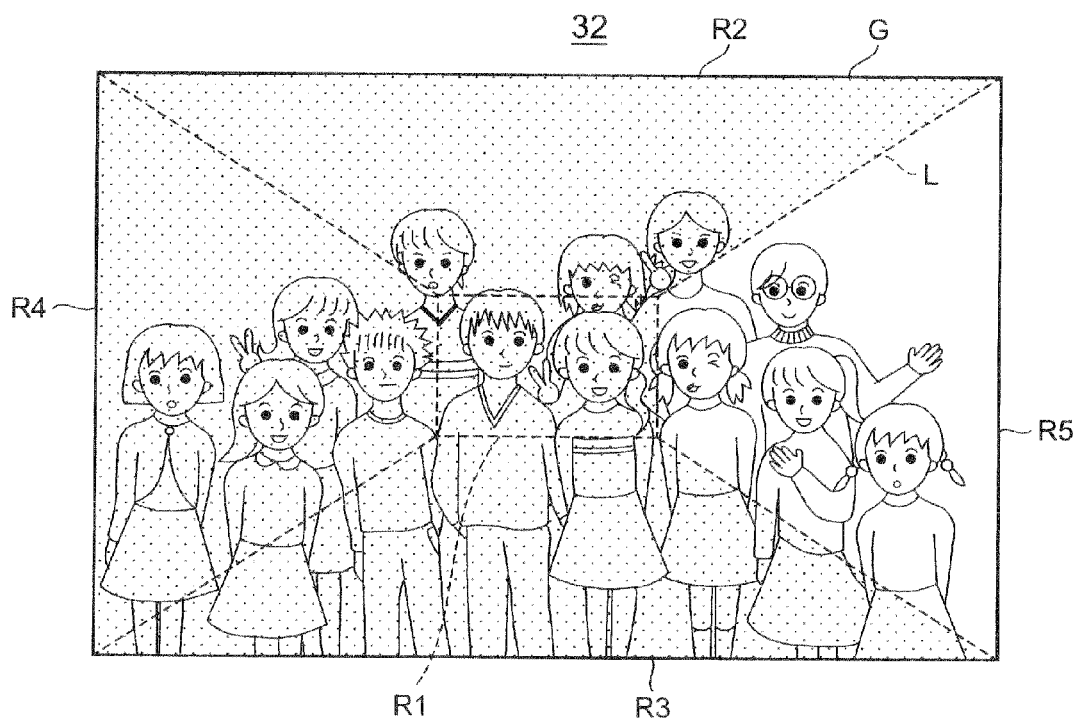
FIG. 5 is a diagram for explaining the targeted are of the image which is to be displayed in the image display section of the image pickup apparatus of FIG. 1.

Then, when any one of the buttons (for example, the right cursor button c5) among the cursor buttons c2, c3, c4 and c5 and the set button c1 is pressed by a user while the live view image is being displayed, the area (for example, the right area R5) which is corresponded with the pressed button is assigned as the targeted area R for the face detection (see FIG. 5).

Further, the image display section 32 displays the face detection frame A (see FIG. 6A and the like) by superimposing the face detection frame A on the face which is detected in the face detection process.

In particular, for example, when a group picture of 13 persons is to be picked up, the image display section 32 sequentially displays a plurality of image frames G (displays the live view image) as shown in FIGS. 6A to 7B. Further, at this time, when a face is detected in the face detection process within the targeted area R which is set based on the pressing of the cursor button c2, c3, c4 or c5 or the set button c1 of the selection set buttons 41c (see FIG. 6A), the image display section 32 displays the approximate rectangular face detection frame A by superimposing the face detection frame A on the face.

Figure 6A:
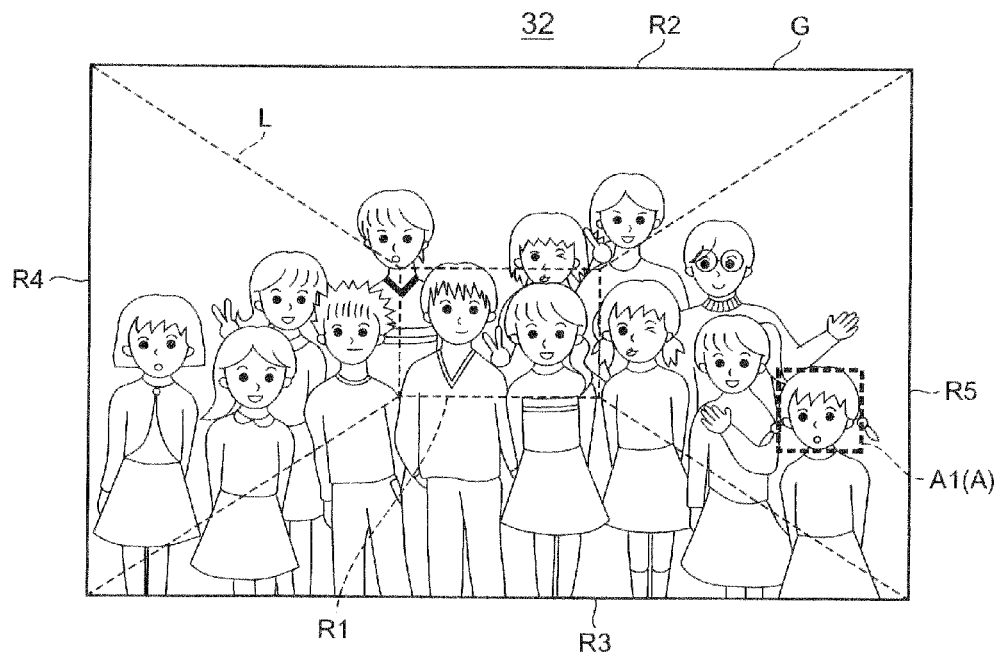
FIGS. 6A and 6B are diagrams schematically showing examples of images to be displayed in the image display section of the image pickup apparatus of FIG. 1.
Figure 6B:
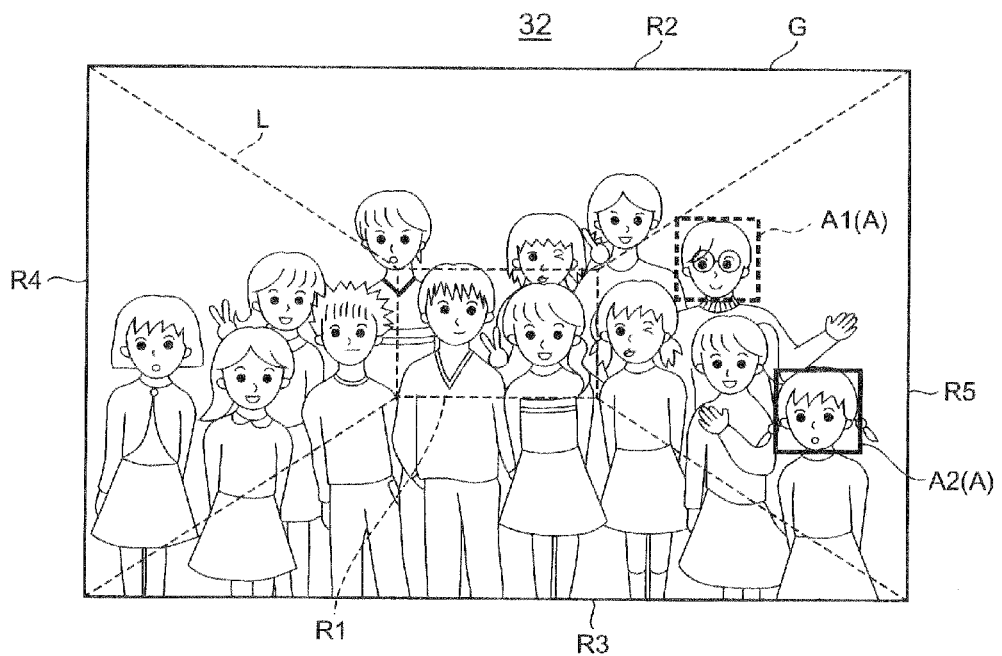
Figure 7A:
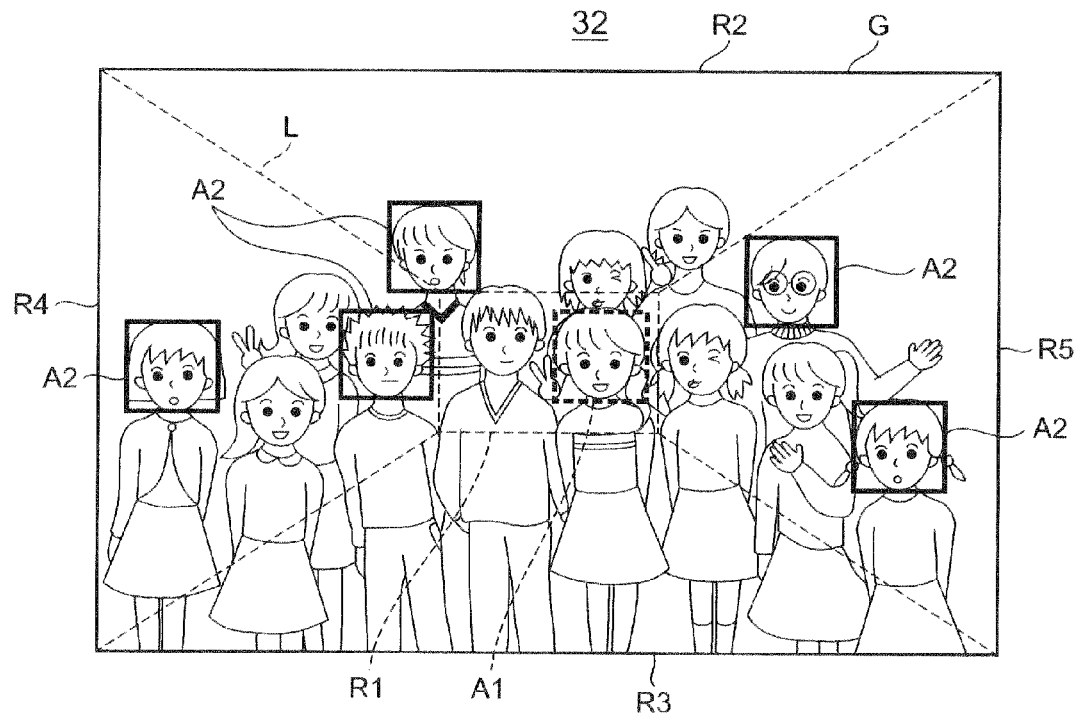
FIGS. 7A and 7B are diagrams schematically showing examples of images to be displayed in the image display section of the image pickup apparatus of FIG. 1.
Figure 7B:
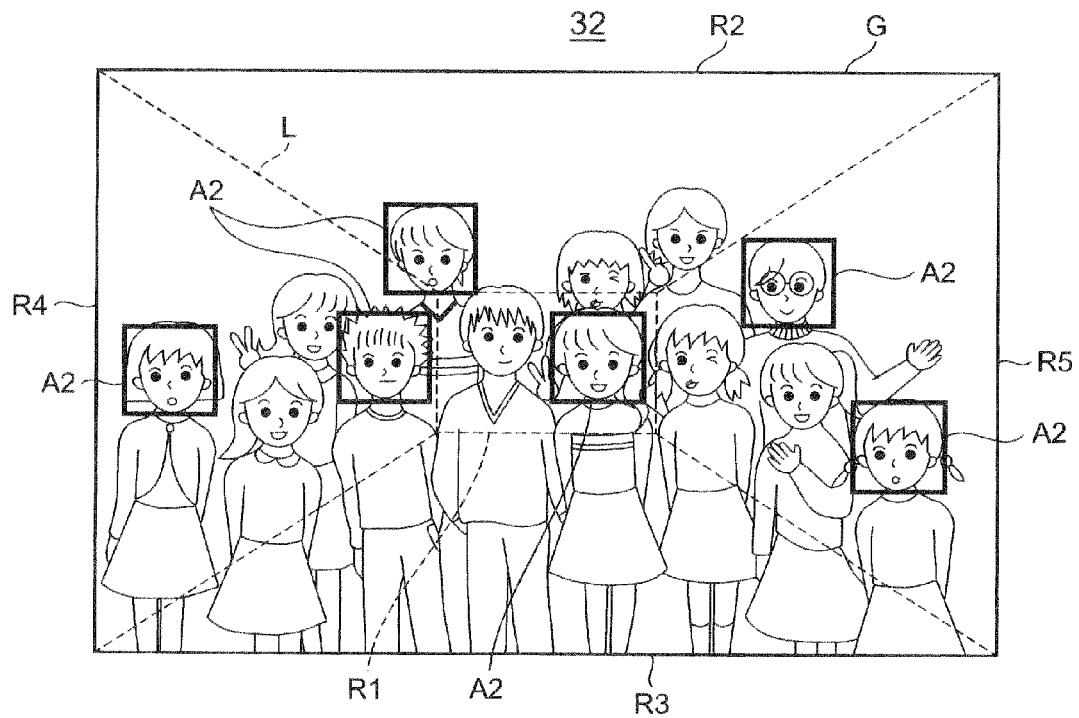

Here, the image display section 32 displays the face detection frame A1 by superimposing the face detection frame A1 on the face which has the best evaluation value based on the evaluation standard in the face detection process (see FIG. 6A). Then, when the cursor button c2, c3, c4 or c5 or the set button c1 which is corresponded with the targeted area R for the face detection process is continuously operated, the face detection frame A1 is displayed by superimposing the face detection frame A1 on the face which has the second best evaluation value detected in the face detection process (see FIG. 6B). At this time, the image display section 32 displays additional face detection frame A1 every time the face is newly detected in the face detection process, and the image display section 32 displays the face detection frame A1 (shown in dashed line in the drawing) of the newly detected face (the face which is detected lastly and added) and the face detection frame A2 (shown in solid line in the drawing) of the face which is already detected in different manners (see FIG. 6B).

Here, the image display section 32 constitutes the identification display unit which identifies and displays the face which is detected in the image frame G in the face detection process.

As for the different manners of the face detection frames, type of the line may be changes, thickness of the line may be changed, color of the line may be change and degree of transmittance of the face image portion in the frame may be changed.

Here, as for the evaluation standard of face detection, there are the AF evaluation value (contract of the face), size of the face, color of the face, inclination of the face and the like, for example.

That is, the image display section 32 displays the approximate rectangular face detection frame A by superimposing the face detection frame A on the face which is orderly detected in the order of faces having a good AF evaluation value, in the order of faces of large size, in the order of faces in which color is red or in the order of faces facing front in the face detection process within the targeted area R set by the pressing of the cursor button c2, c3, c4 or c5 or the set button of the selection setting button 41c every time the button which is corresponded with the targeted area R is continuously operated.

The evaluation standard may be assigned and set based on the predetermined operation of the operation section 4 by a user in advance, or may be set by switching to a predetermined evaluation standard among a plurality of evaluation standards according to number of times (number of times the setting instruction is inputted) the button which is corresponded to the same area is continuously operated, the long-press of the button or the like at the time when the cursor button c2, c3, c4 or c5 or the set button c1 is pressed Here, the operation section 4 (the cursor buttons c2, c3, c4 and c5 and the set button c1) constitutes the evaluation standard assigning unit to assign a predetermined evaluation standard in which the evaluation value is to be calculated. Further, the operation section 4 (cursor buttons c2, c3, c4 and c5 and the set button c1) constitutes the evaluation standard switching setting unit to switch and set the evaluation standard according to the detection by the face detection process among a plurality of evaluation standards according to the number of times the setting instruction of the same targeted area R is continuously inputted.

The operation section 4 is for carrying out a predetermined operation of the image pickup apparatus 100, and the operation section 4 comprises an operation input section 41, an input, circuit 42 and the like.

The operation input section 41 comprises a shutter button 41a, a mode setting button 41b, the selection setting button 41c and the like.

The shutter button 41a is provided at the upper surface of the body of the image pickup apparatus 100, and the shutter button 41a instructs the recording of the image of the subject which is to be picked up by the image pickup section 1. Here, the shutter button 41a constitutes the instructing unit to instruct the recording of the image frame of the subject which is to be picked up by the image pickup section 1.

The mode setting button 41b is provided at the back surface of the body of the image pickup apparatus 100, and the mode setting button 41b instructs the selecting and setting of a predetermined operation mode among a plurality of operation modes of the image pickup apparatus 100.

Here, as for the operation modes, there are a still image photographing mode to photograph a still image of a predetermined size, a moving image photographing mode to photograph a moving image at a predetermined frame rate, a face detection mode to detect a face in the subject and the like, for example. Further, more in particular, in the still image photographing mode, a plurality of photographing modes such as the backlit condition photographing, the scenery photographing and the like in which the relations between the brightness of the face portion and the back ground portion in the image frame G are defined and any one of the photographing modes among the plurality of photographing modes is selected and set based on the predetermined operation of the mode setting button (photographing mode setting unit) 41b.

Further, when a predetermined operation is carried out to the mode setting button 41b by a user to select a predetermined operation mode (for example, the face detection mode or the like), the setting instruction of the selected operation mode is outputted to the CPU 71 via the input circuit 42. When the setting instruction is inputted, the CPU 71 controls each part to carry out the setting according to the operation mode.

The selection setting button 41c is provided at the back surface of the body of the image pickup apparatus 100 and at the lower side of the mode setting button 41b, and the selection setting button 41c comprises the cursor buttons c2, c3, c4 and c5 of up, down, left and right which are for selecting various types of items, the set button c1 which is provided at inner side of the cursor buttons c2, c3, c4 and c5 and the like.

Further, the cursor buttons c2, c3, c4 and c5 of up, down, left and right and the set button c1 input the setting (selecting) instruction of the targeted area R which is to be the AF target for the automatic focus (AF) process and the target for face detection in the AE area of the automatic exposure process and input the execution instruction of the changing process to orderly change the condition for face detection in the face detection process by being pressed.

In particular, the up cursor button c2 instructs so as to set the targeted area R to the upper area R2, the down cursor button c3 instructs so as to set the targeted area R to the lower area R3, the left cursor button c4 instructs so as to set the targeted area R to the left area R4, the right cursor button c5 instructs so as to set the targeted area R to the right area R5 and the set button c1 instructs so as to set the targeted area R to the center area R1.

Based on pressing of any one of the buttons among the cursor buttons c2, c3, c4 and c5 of up, down, left and right and the set button c1, the setting instruction of the area corresponding to the pressing among a plurality of the areas is outputted to the CPU 71 via the input circuit 42. When the setting instruction is inputted, the CPU 71 controls each part to set the targeted area R, and thereafter the CPU 71 detects a face in the targeted area R.

Then, when the button which is same as the cursor button c2, c3, c4 or c5 or the set button c1 which is corresponded to the targeted area R is continually pressed, the CPU 71 carries out a resetting process (after-mentioned) of threshold of brightness for the face detection for each pressing and detects a new face in the order from a face having the best level of evaluation value to a face having bad evaluation value (orderly resets the threshold of brightness for each pressing so that the face can be detected more easily in the face detection process)

Further, when a different button among the cursor buttons c2, c3, c4 and c5 and the set button c1 is pressed, the CPU 71 sets the area corresponding to the pressed button as the new targeted area R and detects a face in the new targeted area R.

In such way, the above plurality of cursor buttons c2, c3, c4 and c5 and the set button c1 also functions as the operation buttons to carry out the selecting operation to select the targeted area R, the instruction operation to change (gradually lowering) the level of evaluation value of the evaluation standard and the instruction operation to instruct the execution of the face detection process to detect a face based on the set evaluation standard and the evaluation value, and the plurality of instructions can be carried out at the same time by only pressing any one of the above buttons once.

Further, the plurality of cursor buttons c2, c3, c4 and c5 and the set button c1 can be operated at any time in a condition of waiting for the photographing instruction from a user while repeatedly executing the face detection process when the live view image is being displayed, and the adding and switching of the face can be carried out in real time.

Here, the cursor buttons c2, c3, c4 and c5 of up, down left and right and the set button c1 constitute the instruction operation unit which receives a plurality of instruction operations which are different from one another and which are respectively corresponded to a plurality of targeted areas R dividing the image frame G. Further, the cursor buttons c2, c3, c4 and c5 of up, down, left and right and the set button c1 constitute the setting instruction inputting unit to input the setting instruction of the targeted area R which is corresponded to the instruction operation based on any one of the instruction operations among the instruction operations different from one another which are corresponded to a plurality of targeted areas R which are to be the target for the face detection in the image frame G.

The input circuit 42 is to input the operation signal which is inputted from the operation input section 41 to the CPU 71.

The recording medium 5 is constituted with a card type non-volatile memory (flash memory), a hard disk and the like, for example, and the recording medium 5 stores a plurality of image files constituted of image data and the like of the image frame which is picked up by the image pickup section 1 in a condition where the image pickup related processes such as the automatic focus process and the automatic exposure process are executed. Here, the recording medium 5 constitutes the recording unit to record the image frame which is picked up by the image pickup section 1 in a condition where the image pickup related processes are executed according to the instruction by the shutter button 41a.

The USB terminal 6 is a terminal for connecting with an external device, and carries out sending and receiving of data via the USB cable (omitted from the drawing) or the like.

The control section 7 controls each part of the image pickup apparatus 100, and comprises the CPU 71, the program memory 72, the data memory 73 and the like, for example.

The CPU 71 carries out various types of control operations according to various types of process programs for the image pickup apparatus 100 which are stored in the program memory 72.

The data memory 73 is constituted with a flash memory or the like, for example and temporarily stores data and the like to be processed by the CPU 71.

The program memory 72 stores various types of programs and data which are needed for the operation of the CPU 71. In particular, the program memory 72 stores a targeted area setting program 72a, a face detection program 72b, a face detection condition changing program 72c, an identification display control program 72d, a focus control program 72e, an exposure condition adjusting program 72f and the like.

The targeted area setting program 72a makes the CPU 71 function as the targeted area setting unit. That is, the targeted area setting program 72a is a program for making the CPU 71 realize a function according to the targeted area setting process to sequentially set the area according to the setting instruction as the targeted area R which is to be the target for face detection in the face detection process based on the setting instruction of the targeted area R inputted based on the pressing of any one of the buttons among the cursor buttons c2, c3, c4 and c5 of up, down, left and right and the set button c1 of the operation section 4 by a user In particular, by the CPU 71 executing the targeted area setting program 72a, the targeted area R is set to the upper area R2 (see FIG. 4) based on the pressing of the up cursor button c2 by a user. Similarly, the targeted area is set to the lower area R3 (see FIG. 4) based on the pressing of the down cursor button c3, the targeted area R is set to the left area R4 (see FIG. 4) based on the pressing of the left cursor button c4, the targeted area R is set to the right area R5 (see FIG. 4) based on the pressing of the right cursor button c5 and the targeted area R is set to the center area R1 (see FIG. 4) based on the pressing of the set button c1.

Here, by the CPU 71 executing the targeted area setting program 72a, the CPU 71 functions as the first switching unit to switch the targeted area R which is to be the target for detection in the face detection process to the area corresponding to the received instruction operation when any one of the instruction operation is received by the cursor button c2, c3, c4 or c5 of up, down, left and right or the set button c1.

The face detection program 72b makes the CPU 71 function as the face detection unit. That is, the face detection program 72b is a program for making the CPU 71 realize a function according to the execution of the face detection process to sequentially detect faces of the subjects from each of the plurality of image frames G generated by the image pickup section 1.

In particular, based on the execution of the face detection program 72b by the CPU 71, the face image search frame is scanned in a predetermined direction by setting the face image search range as a predetermined range (for example, a predetermined targeted area R or the entire image frame G) of the image frame G for one of the image frame G among the plurality of image frames G to specify feature parts (face parts) corresponding to eyes, nose, mouth and the like and determines whether the search frame area is a face or not from the positional relation of each face parts. When it is determined as a face by being greater than a, predetermined evaluation value (threshold), the search frame area is assumed as a face. Further, when a face is detected in a predetermined image frame G, the face detection is carried out by setting a predetermined area near the detected face as the face image search range in the next image frame.

Then, when a face is detected, the image display section 32 displays the face detection frame A by superimposing the face detection frame A on the face (see FIG. 2).

Here, by the CPU 71 executing the face detection program 72b, the CPU 71 functions as the detection unit to detect a specific subject (for example, face of the subject) in any one of the plurality of targeted areas R which divided the image frame G.

Further, the CPU 71 carries out an evaluation based on a predetermined evaluation standard and calculates an evaluation value every time when the button which is same as to button corresponded to the targeted area R set by the targeted are setting process among the cursor button c2, c3, c4 and c5 of up, down, left and right and the set button of the operation section 4 is pressed by a user to detect the faces in the order from the face having good evaluation value or from the face having bad evaluation value.

That is, by the CPU 71 executing the face detection program 72b, when the button corresponded to the targeted are R is pressed again after the face detection process is executed by setting the targeted area R which is set based on the pressing of any one of the cursor buttons c2, c3, c4 and c5 of up, down, left, right and the set button c1 of the operation section 4 by a user as a target for the face detection, the face having the best evaluation value in a predetermined evaluation standard among the evaluation standards such as the AF evaluation value, size of the face, color of the face inclination of the face and the like after the face detection condition is changed by the face detection condition changing process (after-mentioned). Subsequently, every time the button same as the button which is corresponded to the above targeted area is pressed, the CPU 71 changes the face detection condition again and thereafter orderly detects a face in the order of faces having good evaluation value based on the evaluation value of the evaluation standard Here, by the CPU 71 executing the face detection program 72b, the CPU 71 functions as the evaluation unit to evaluate each of the faces (specific subject) of the subjects in the image frame G based on a predetermined evaluation standard and to calculate the evaluation value.

Here, regarding the evaluation of the AF evaluation value, for example, when the focus is on the closest face in the subjects, the closer the face is to the image pickup apparatus 100, the better the evaluation Further, regarding the evaluation of size of the face, for example, the larger the size of the face, the better the evaluation, regarding the evaluation of color of the face, for example, the more red the face is, the better the evaluation and regarding the inclination of the face, for example, the more the face is facing front, the better the evaluation.

The face detection condition changing program 72c makes the CPU 71 function as the face detection condition changing unit. That is, the face detection condition changing program 72c is a program for making the CPU 71 realize a function according to the face detection condition changing process to orderly change a condition for the face detection in the face detection process according to the number of times of the instruction operation without changing the targeted area R which is to be the target for face detection set by the targeted area setting process when the instruction operation same as the instruction operation according to the targeted area R set in the targeted area setting process is continuously carried out.

Figure 8A:
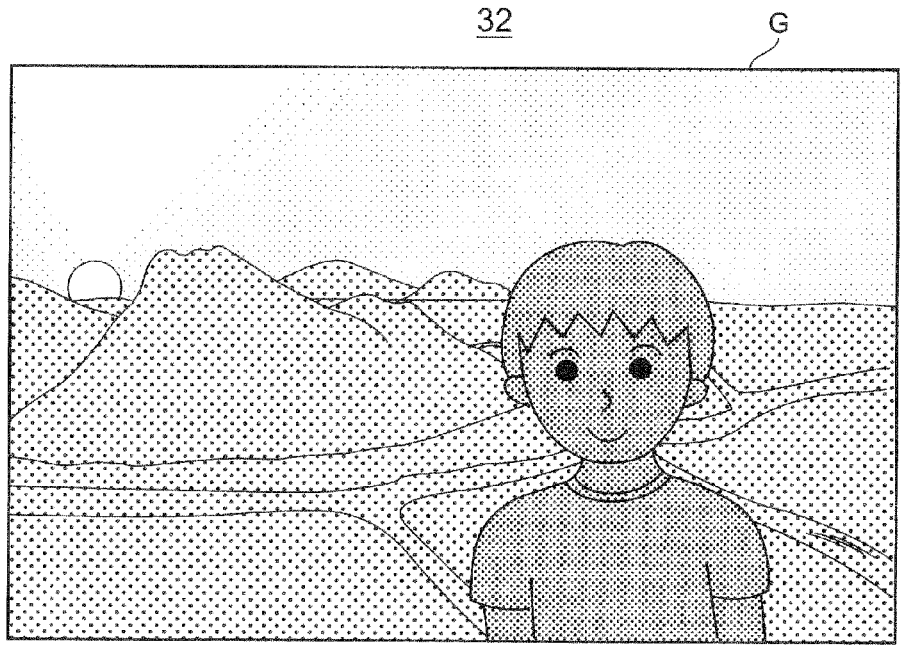
FIGS. 8A and 8B are diagrams for explaining a threshold resetting process carried out by the image pickup apparatus of FIG. 1 and are diagrams schematically showing that photographing of the subject is in backlit condition.
Figure 8B:
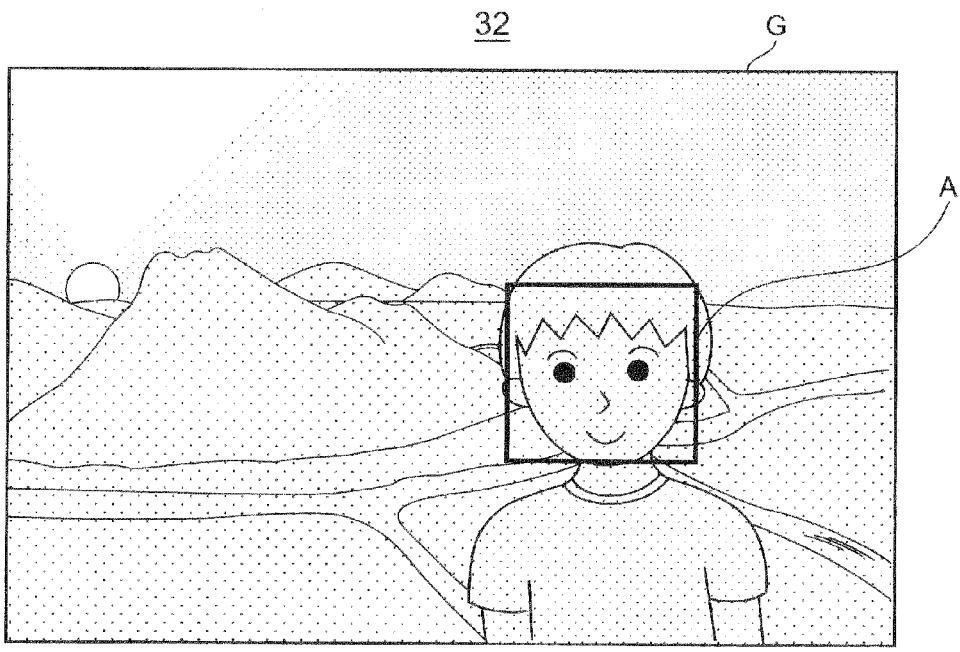

In particular, by the CPU 71 executing the face detection condition changing program 72c, the resetting instruction of the threshold of brightness for the face discrimination in the face detection is inputted by the operation button (resetting instruction input unit) same as the operation button which is pressed when setting the targeted area R in the targeted area setting process among the cursor buttons c2, c3, c4 and c5 of up, down, left and right and the set button c1 is continuously pressed. Then, every time the resetting instruction is inputted, the threshold resetting process to orderly reset the threshold of brightness so that the face can be detected more easily in the face detection process is carried out. For example, as shown in FIGS. 8A and 8B, when the image is determined as being in backlit condition (see FIG. 8A) from the distribution of the pixel value of the image frame G generated by the electronic image pickup section 12, the CPU 71 shifts and resets the threshold of brightness in the face detection to be darker so that the face detection can be carried out by a small amount of difference of darkness (brightness). Such process is carried out because in many cases the faces are dark in backlit condition Further, the exposure time is made to be longer and the photographic sensibility is made to be increased by changing the timing of the electronic shutter. In such way, the live view image becomes brighter in its entirety and the face can be detected more easily in the face detection process.

Figure 9A:
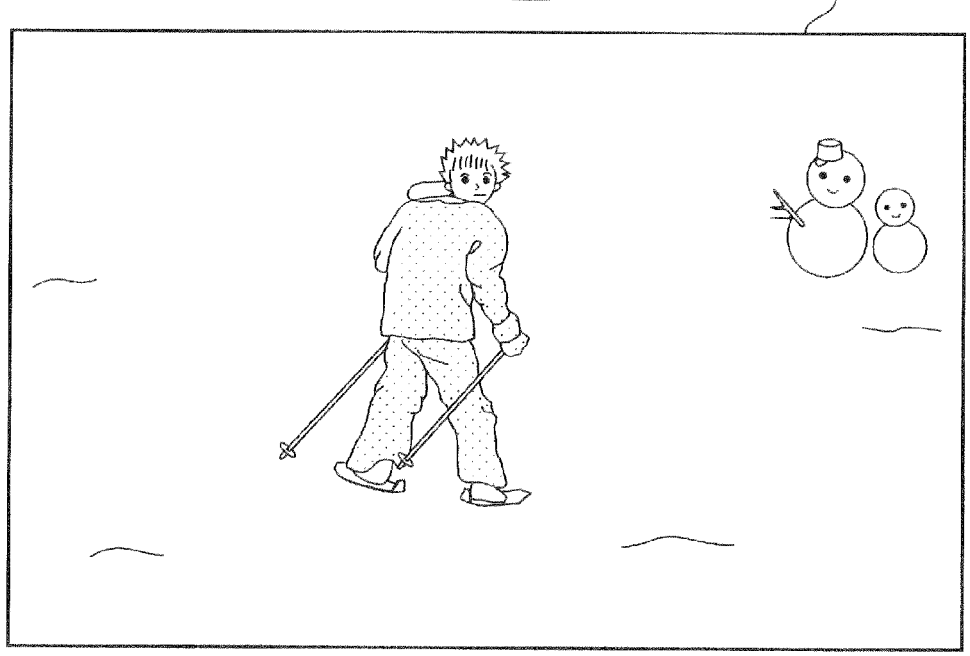
FIGS. 9A and 9B are diagrams for explaining the threshold resetting process carried out by the image pickup apparatus of FIG. 1 and are diagrams schematically showing that photographing of the subject is in whiteout condition.
Figure 9B:
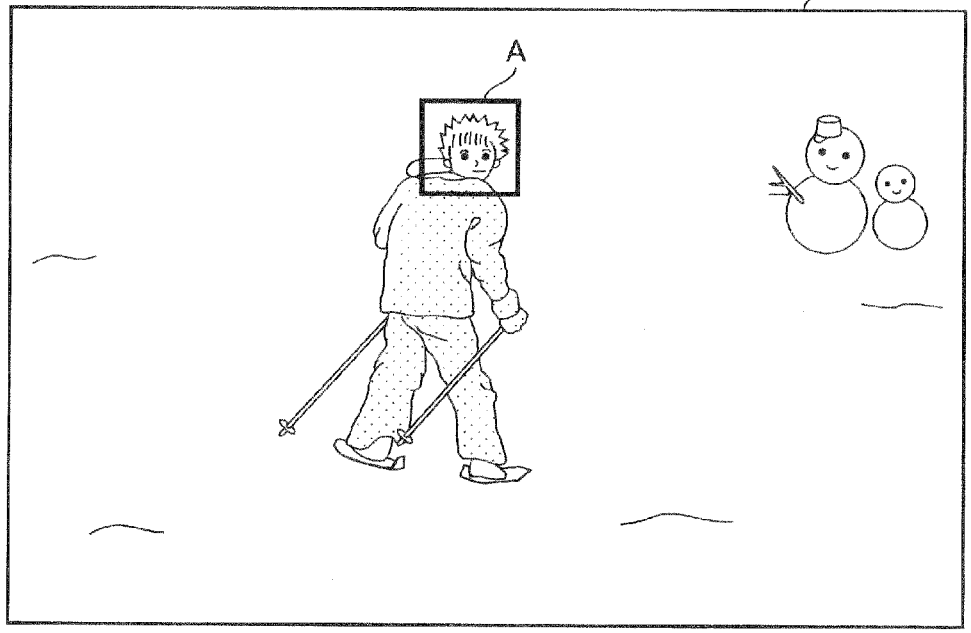

Further, as shown in FIGS. 9A and 9B, when the image is determined as being in whiteout condition (see FIG. 9A) from the distribution of the pixel value of the image frame G generated by the electronic image pickup section 12, the CPU 71 shifts and resets the threshold of brightness in the face detection to be brighter so that the face detection can be carried out by a small difference of brightness because in many cases the faces are white, and the CPU 71 changes the timing of the electronic shutter to make the exposure time be shorter. In such way, the brightness of the live view image is suppressed and the face can be detected more easily in the face detection process.

Here, in a case of blackout condition, the faces are black in many cases, therefore, the threshold of brightness in the face detection is shifted and reset to be darker and the timing of the electronic shutter is changed to make the exposure time be longer.

By the CPU 71 executing the face detection condition changing program 72c, the CPU 71 functions as the condition changing unit to orderly change the condition for face detection (detection condition of specific subject) according to the number of times of the instruction operation without switching the targeted area R which is to be the target for detection in the face detection process when the same instruction operation is continuously carried out by the cursor buttons c2, c3, c4 or c5 of up, down, left and right or the set button c1 Further, by the CPU 71 executing the face detection condition changing program 72c, the CPU 71 functions as the threshold resetting unit to orderly reset the threshold of brightness every time the resetting instruction of threshold of brightness for the face discrimination in the face detection is inputted so that the faces (specific subject) of the subjects can be detected more easily in the face detection process Moreover, when the face detection cannot be carried out in the face detection even after resetting the threshold of brightness as described above, the face part to be specified in the face detection process is changed by considering the influence relating to the inclination of the face because there is a possibility that the face is inclined. For example, although the accuracy declines comparing to the case where the face detection is carried out by considering both eyes, nose, mouth and the like, the face detection may be carried out by the positional relation of lesser face parts such as one eye and nose. Further, the face detection may be carried out by nose and mouth considering the usage of sunglasses, eyeglasses and the like, or the face detection may be carried out by eyes and nose considering the usage of a mask and the like.

Here, according to the photographing mode set among a plurality of photographing modes, the threshold of brightness may be reset so as the be increased or so as to be decreased every time the resetting instruction of the threshold of brightness for the face detection is inputted. For example, when the backlit condition photographing mode is set as the photographing mode, the threshold of brightness for the face detection may be reset so as to decrease every time the resetting instruction is inputted, and when the scenery photographing mode such as photographing of ski slope and the like which can easily be whited out is set, the threshold of brightness for the face detection may be reset so as to increase every time the resetting instruction is inputted.

The identification display control program 72d makes the CPU 71 function as the additional identification display control unit. That is, the identification display control program 72d is a program for making the CPU 71 realize a function according to the identification display process to display the face detection frame A in the image display section 32 by superimposing the face detection frame A on the faced newly detected in the face detection process.

In particular, by the CPU 71 executing the identification display control program 72d, the face detection frame A which is different from the face detection frame A superimposed on the face which is already detected is displayed in the image display section 32 by being superimposed on the face which is detected and added lastly in the face detection process.

In such way, the face which is newly detected in the face detection process is added and is identified and displayed in the image display section 32.

The focus control program 72e is a program for making the CPU 71 realizes a function according to the automatic focus process to adjust the focus position of the image pickup lens 11 of the image pickup section 1.

In particular, by the CPU 71 executing the focus control program 72e, the focus position of the image pickup lens 11 is adjusted by moving the image pickup lens 11 by the focus drive section 21 in the optical axis direction by setting the face detection frame A to the AF area and setting the image portion in the face detection frame A to the AF target based on the pressing of the shutter button 41a by a user.

Here, the focus position of the image pickup lens 11 may be adjusted by moving the CCD or the CMOS of the electronic image pickup section 12 in the optical axis direction.

The exposure condition adjusting program 72f is a program for making the CPU 71 realize a function according to the automatic exposure (AE) process to adjust the exposure condition at the time of image pickup by the image pickup section 1.

In particular, by the CPU 71 executing the exposure condition adjusting program 72f, the exposure condition (for example, shutter speed, aperture and the like) at the time of image pickup by the image pickup section 1 is adjusted by setting the face detection frame A to the AE area based on the pressing of the shutter button 41a by a user In the automatic focus process and in the automatic exposure process, when a plurality of faces are detected, a face to be standard for the automatic focus process and the automatic exposure process is decided according to the mode selected in advance in the standard face selecting menu screen M1. That is, when the "final person detecting mode" is selected, the face (in the drawing, shown in dashed line) which is detected finally in the face detection process is set as a standard (see FIG. 7A. On the other hand, when the "all-detected average mode" is selected, all of the faces detected in the face detection process are set as a standard (see FIG. 7B).

Here, in the all-detected average mode, because a plurality of faces are detected, the automatic focus process and the automatic exposure process are carried out so that the focus and brightness will be optimized when targeting all of the persons in a plurality of AF areas and AF areas as targets. For example, when a plurality of persons exist in different distances, focus will be adjusted to the intermediate distance and the photographing is carried out by setting the aperture value so as to be set to the depth of field corresponding to the distance difference. When a plurality of subject persons have different brightness, the exposure adjustment is carried out by adjusting to the dark person within a range where the most bright person will not be whited out.

Figure 10:
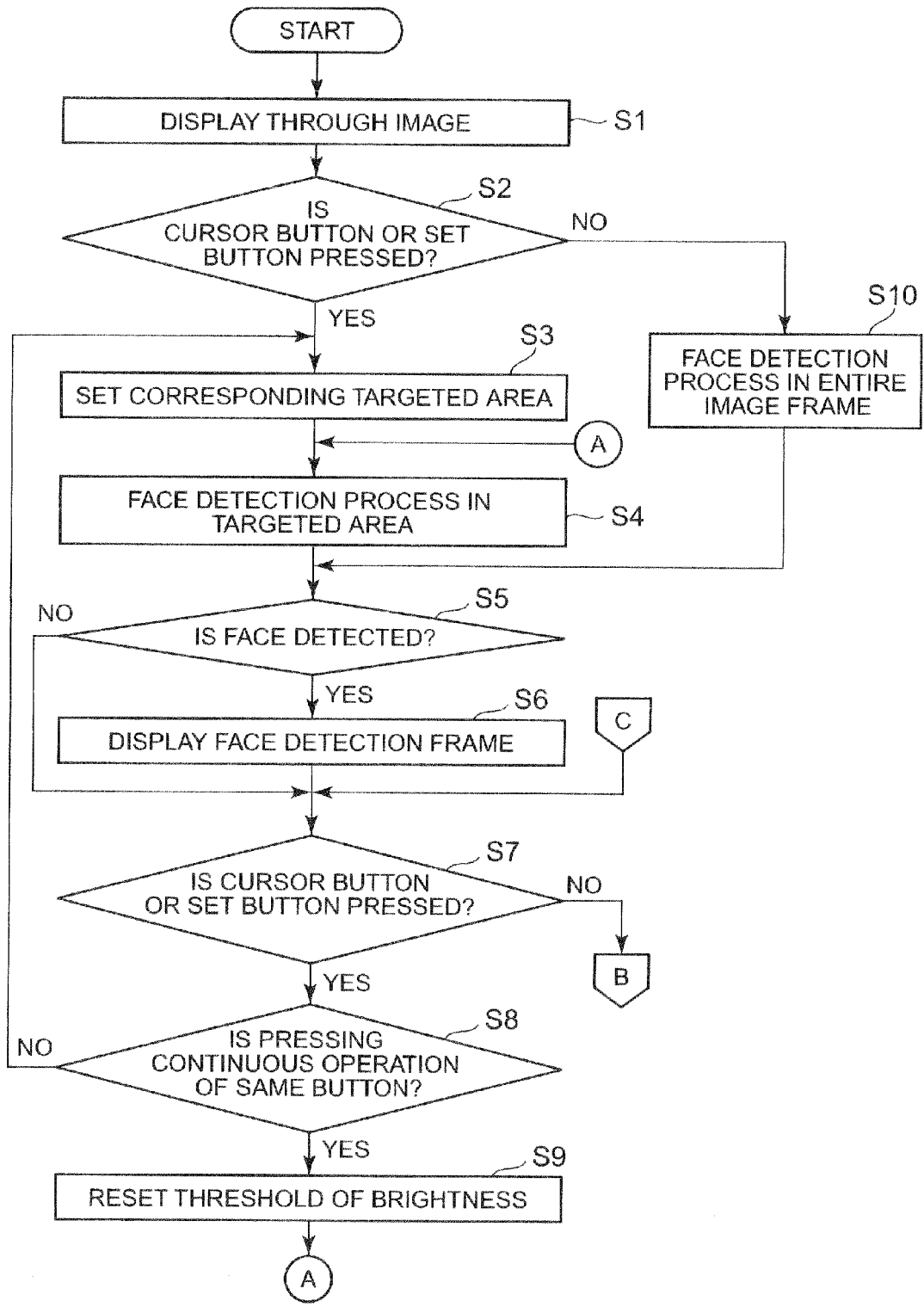
FIG. 10 is a flowchart showing an example of operation according to an image pickup process carried out by the image pickup apparatus of FIG. 1.

In such way, by the CPU 71 executing the focus control program 72e and the exposure condition adjusting program 72f, the CPU 71 functions as the image pickup related process execution unit to execute the image pickup related processes (the automatic focus process, the automatic exposure process and the like) relating to the image pickup of subject by the image pickup section 1 based on the face detected by the face detection process Next, the image pickup process will be described with reference to FIGS. 10 and 11.

FIGS. 10 and 11 are flowcharts showing an example of operation according to the image pickup process by the image pickup apparatus 100.

As shown in FIG. 10, when the image pickup of the subject by the image pickup section 1 is started, the CPU 71 makes the live view image be displayed in the image display section 32 based on the image data (image frame) picked up and generated by the image pickup section 1 (step S1, see FIG. 2) Next, the CPU 71 determines whether any one of the buttons among the cursor buttons c2, c3, c4 and c5 of up, down, left and right and the set button c1 is pressed or not (step S2).

Here, when the CPU 71 determines that any one of the buttons is pressed (step S2; YES), the CPU 71 executes the targeted area setting program 72a in the program memory 72 and the CPU 71 sets the area (for example, right area R5 or the like) according to the setting instruction as the targeted area R which is to be a target for the face detection in the face detection process based on the setting instruction of the targeted area R inputted based on the pressing of any of the buttons (for example, right cursor button c5 or the like) among the cursor buttons c2, c3, c4 and c5 of up, down, left and right and the set button c1 (step S3).

Next, the CPU 71 executes the face detection program 72b in the program memory 72 to specify a face having the best evaluation value of a predetermined evaluation standard (for example, the AF evaluation value or the like) within the set targeted area R based on the image data generated by the image pickup section 1 (step S4).

Subsequently, the CPU 71 determined whether a face is detected in the face detection process or not (step S5). Here, when the CPU 71 determines that a face is detected (step S5; YES), the CPU 71 executes the identification display control program 72d in the program memory 72 to make an approximate rectangular face detection frame A1 (see FIG. 6A) be displayed in the image display section 32 by superimposing the face detection frame A1 on the face newly detected in the face detection process (step S6).

Thereafter, the CPU 71 determines whether any one of the buttons among the cursor buttons c2, c3, c4 and c5 of up, down, left and right and the set button c1 is pressed by a user or not (step S7).

Here, when the CPU 71 determines that any one of the buttons is pressed (step S7; YES), the CPU 71 determines whether the button same as the button which is pressed in step S2 is continuously operated or not (step S8).

Then, when the CPU 71 determines that the same button is continuously operated (step S8; YES), the CPU 71 executes the face detection condition changing program 72c in the program memory 72 to reset the threshold of brightness based on the input of resetting instruction of the threshold of brightness for the face detection so that the face is detected more easily (step S9).

Thereafter, the process is moved to step S4, and the CPU 71 specifies a face having the second best evaluation value of the predetermined evaluation standard within the set targeted area R.

At this time, when a face is newly detected (step S5; YES) the CPU 71 executes the identification display control program 72d in the program memory 72 to make the face detection frame A1 shown in dashed line (see FIG. 6B) be displayed in the image display section 32 by superimposing the face detection frame A1 on the face newly detected in the face detection process and to make the face detection frame A2 shown in solid line be displayed in the image display section 32 by superimposing the face detection frame A2 on the face which is already detected (step S6).

On the other hand, in step S8, when the CPU 71 determines that the same button is not continuously operated (step S8; NO), the CPU 71 moves the process to step S3 and carries out the process thereafter after resetting the targeted area R.

In step S2, when the CPU 71 determines that any one of the buttons among the cursor buttons c2, c3, c4 and c5 of up, down left and right and the set button c1 is not pressed (step S2; NO), the CPU 71 carries out the face detection process by setting the face image search range to the entire image frame G without carrying out the targeted area setting process (step S10).

Thereafter, the process is moved to step S5, and the CPU 71 determines whether a face is detected in the entire image frame G or not (step 5) and carries out the process thereafter.

The CPU 71 repeats the above described process until the CPU 71 determines that any one of the buttons among the cursor buttons c2, c3, c4 and c5 of up, down, left and right and the set button c1 is not pressed in step S7 (step S7; NO).

Then, when the CPU 71 determines that any of the buttons are not pressed in step S7 (step S7; NO), as shown in FIG. 11, the CPU 71 determines whether the shutter button 41a is pressed by a user or not (step S11).

Here, when the CPU 71 determines that the shutter button 41a is pressed (step S11; YES), the CPU 71 executes the focus control program 72e in the program memory 72 to carry out the automatic focus process by setting the face detection frame A which is superimposed on the face to be the standard for the automatic focus process as the AF area according to the mode selected in advance in the standard face selecting menu screen M1, and also the CPU 71 executes the exposure condition adjusting program 72f in the program memory 72 to carry out the automatic exposure process by setting the face detection frame A which is superimposed on the face to be a standard for the automatic exposure process as the AE area (step S12).

Thereafter, in a condition where the automatic focus process and the automatic exposure process are executed, the CPU 71 controls the execution of the image pickup process to make the image pickup section 1 pickup the final image (recording image) to be recorded in the recording medium 5 (step S13).

In step S11, when the CPU 71 determines that the shutter button 41a is not pressed (step S11; NO), the CPU 71 moves the process to step S7 and carries out the process thereafter.

As described above, according to the image pickup apparatus 100 of the embodiment, the cursor buttons c2, c3, c4 and c5 of up, down, left and right and the set button c1 are corresponded with a plurality of areas which are to be candidates of the targeted area R in which a face to be a standard for the image pickup related processes such as the automatic focus process, the automatic exposure process and the like in the image frame G is detected. Therefore, only by a use pressing any one of the buttons among the cursor buttons c2, c3, c4 and c5 and the set button c1, the area corresponded to the pressed button can be sequentially set as the targeted area R for the face detection. Further, when the button same as the button which is corresponded to the set targeted area R is continuously operated, the condition for face detection in the face detection process can be orderly changed according to the number of times the button is operated without changing the targeted area P set in the targeted area setting process. In particular, every time the resetting instruction of threshold is inputted, the threshold of brightness for the face detection is reset so that the threshold of brightness is increased or so that the threshold of brightness is decreased according to the photographing condition (for example, backlit condition, whiteout condition and the like) determined from distribution of pixel value of the image frame G.

In such way, switching of the targeted area R can be carried out in real time while a user confirming the condition in which the face is detected in the image frame G. Therefore, the targeted area R for the face detection can be changed promptly. Further, because the face detection is carried out within the set targeted area R, speed of the face detection can be made to be faster and the detection of a desired face can be carried out more promptly comparing to the case where the face detection is carried out in the entire image frame G. Furthermore, the switching instruction of the targeted area R and the resetting instruction of the threshold for the face detection can be carried out in one instruction operation at the same time. Therefore, a face desired by a user can be selected easily and promptly.

Moreover, every time the cursor button c2, c3, c4 or c5 or the set button c1 is pressed, the face detection frame A can be orderly displayed by being superimposed on the face which is newly detected in the face detection process. Especially, because a face detection frame A which is different from the face detection frame A superimposed on the face which is already detected is displayed in the image display section 32 by being superimposed on the face which is detected and added finally in the face detection process, identification of the face to be the standard for the image pickup related processes such as the automatic focus process, the automatic exposure process and the like can be carried out easily.

Further, every time the cursor button c2, c3, c4 or c5 or the set button c1 is pressed, the evaluation value of predetermined evaluation standard which is set in advance is calculated and the faces can be orderly detected in the order from faces having good evaluation value based on the evaluation value. Therefore, the faces can be easily specified in the order of faces having good evaluation value in any one of the evaluation standard.

Here, the present invention is not limited to the above embodiment, and various types of modifications and changes in design may be carried out within the scope of the invention.

Hereinafter, a modification example of the image pickup apparatus 100 will be described.

MODIFICATION EXAMPLE 1

As shown in FIGS. 12 and 13, the image pickup apparatus 200 of the modification example 1 carries out the face detection process in the set targeted area R and specifies all of the faces which are detected. Thereafter, based on the continuous pressing of the button same as the button which corresponded to the targeted area R among the cursor buttons c2, c3, c4 and c5 of up, down, left and right and the set button c1, the threshold for the discrimination of a face in the face detection process is orderly decreased to make the face be more easy to detect.

As shown in FIG. 12, a face specifying program 72g is stored in the program memory 72 in addition to the targeted area setting program 72a, the face detection program 72b, the face detection condition changing program 72c, the identification display control program 72d, the focus control program 72e and the exposure condition adjusting program 72f.

The face specifying program 72g makes the CPU 71 function as the face specifying unit. That is, the face specifying program 72g is a program for making the CPU 71 realize a function according to the face specifying process to specify any one of the faces among a plurality of faces detected in the face detection process.

Figure 13A:
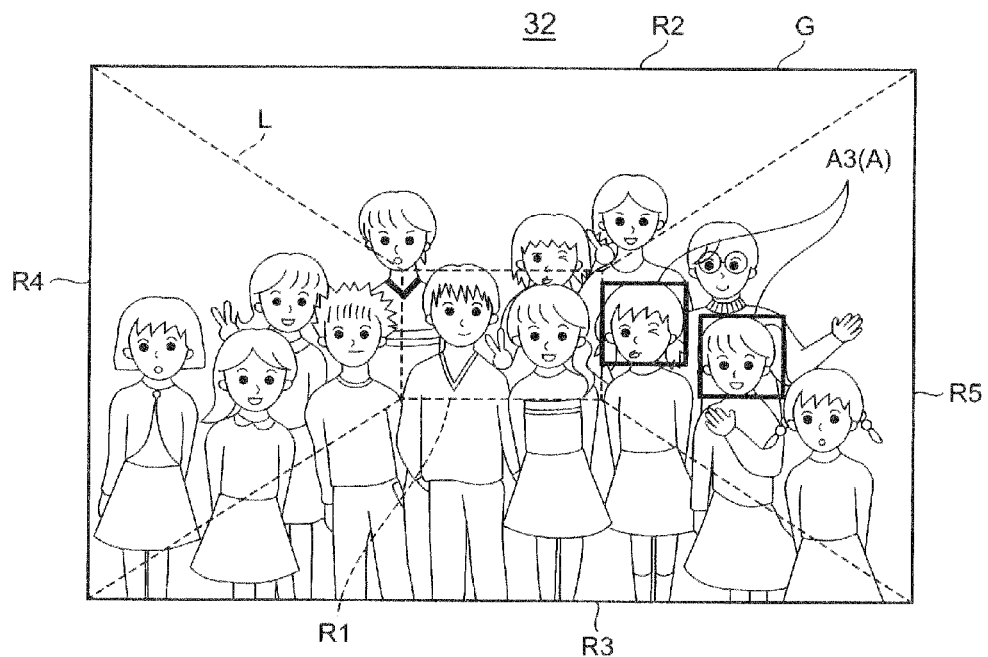
FIGS. 13A and 13B are diagrams schematically showing examples of images to be displayed in an image display section of the image pickup apparatus of FIG. 12.

In particular, by the CPU 71 executing the face specifying program 72g, the area (for example, right area R5 or the like) which is assigned by the targeted area setting process executed based on the pressing of any one of the buttons among the cursor buttons c2, c3, c4 and c5 of up, down, left and right and the set button c1 by a user is set as the specifying targeted area R for the face specifying process, and all of the faces which are discriminated and detected in the specifying targeted area based on a predetermined threshold for the discrimination of the face in the face detection process are specified (see FIG. 13A). Here, by the CPU 71 executing the face specifying program 72g, the CPU 71 functions as the second switching unit so as to switch the area which is to be the target for the face specifying process to the specifying targeted area R corresponding to the received instruction operation when any one of the instruction operation is received from the cursor button c2, c3, c4 or c5 of up, down, left and right or the set button c1.

Figure 13B:
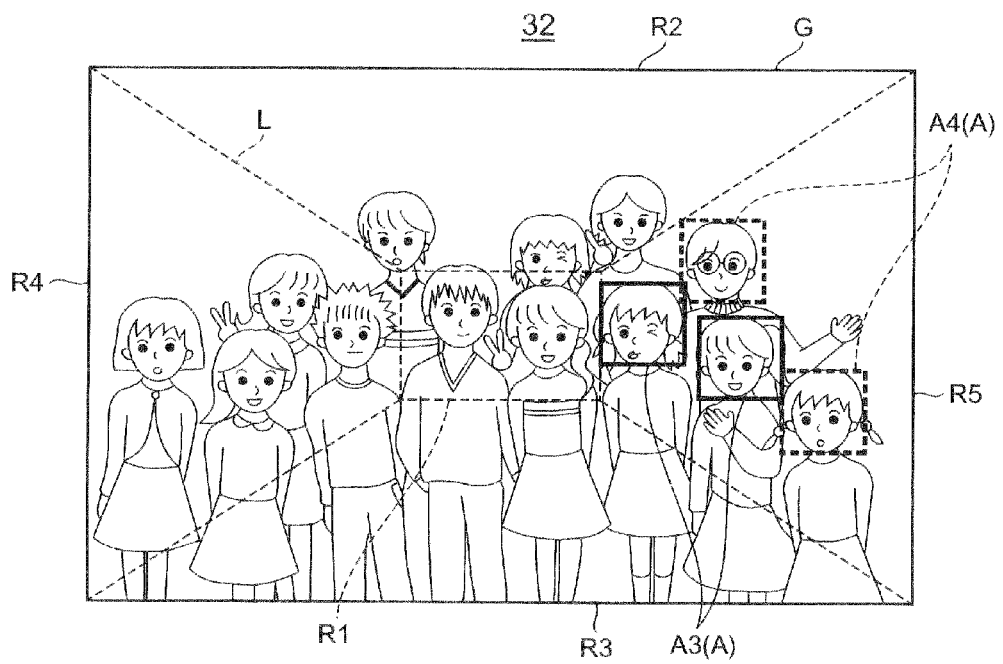

Then, when the threshold for the face discrimination is reset in the face detection condition changing process based on the continuous pressing of the button same as the button which is corresponded to the targeted area R among the cursor buttons c2, c3, c4 and c5 of up, down, left and right and the set button c1 so that the faces are detected more easily, the CPU 71 specifies all of the faces which are discriminated and detected based on the reset threshold similarly to the above described process (see FIG. 13B).

Further, in the identification display process by the CPU 71, face detection frames A in different forms are superimposed on the face specified before the threshold is reset aid on the face specified after the reset and the different face detection frames A are identified and displayed in the image display section 32 (see FIGS. 13A and 13B). That is, for example, the face detection frame A3 in solid line is superimposed and displayed on the face specified before the threshold is reset, and on the other hand, the face detection frame A4 in dashed line is superimposed and displayed on the face specified after the threshold is reset.

Here, the identification display of the face specified before the threshold is reset and the face specified after the reset is not limited to the display by changing type of the line of the face detection frames A. For example, color of the face detection frames A may be changed, thickness of the line of the face detection frames A may be changed or degree of transmittance may be changed.

Therefore, according to the image pickup apparatus 200 of the modification example 1, all of the faces detected in the targeted area R which is set in the targeted area setting process based on the pressing of any one of the buttons among the cursor buttons c2, c3, c4 and c5 of up, down, left and right and the set button c1 by a user can be specified. Further, after the threshold for the discrimination of a face is reset in the face detection condition changing process based on the continuous pressing of the button same as the button corresponded to the targeted area R so that the face is detected more easily, all of the faces which are discriminated and detected based on the threshold which is reset can be specified.

In such way, specification of all of the faces detected in the predetermined targeted area R can be carried out easily. Further, by orderly resetting the threshold of brightness every time the resetting instruction of the threshold for the detection of a face in the face detection process is inputted so that the face is detected more easily, faces which are not yet detected in the targeted area R can be detected and specified easily.

Furthermore, by orderly decreasing the threshold of brightness for the discrimination of faces from a predetermined level, a condition in which unnecessary faces are always detected, such as in a case where the threshold is set to low level from the beginning, can be prevented.

Moreover, by identifying and displaying the face detected and specified in the face detection process by the face detection frame A in a form different from the face detection frame for the face detected before the threshold is reset based on the threshold which is reset, the photographer can easily know that the face is detected based on the threshold which is different from the face detected based on a normal threshold.

Here, in the above modification example 1, the image pickup process of the image frame G by the image pickup section 1, the face detection process by the CPU 71 and the display process of the image frame G by the image display section 32 are repeatedly executed under the control of the CPU 71 as the execution control unit until the shutter button 41a is pressed. When the setting instruction of the targeted area R for the face specification process is inputted based on the pressing of the cursor button c2, c3, c4 or c5 or the set button c1 by a user at an arbitrary timing when the above plurality of processes are repeatedly executed, the CPU 71 may carry out the process to reset the targeted area R as the changing control unit to display the face detection frame A by superimposing the face detection frame A on the face specified by carrying out the face specification process in the targeted area R which is reset.

Further, at an arbitrary timing when the above plurality of processes are repeatedly executed, the CPU 71 may repeatedly receive the input of setting instruction of the targeted area R for the face specification process based on the pressing of the cursor button c2, c3, c4 or c5 or the set button c1 by a user.

Furthermore, all of the faces which are detected in the face detection process are specified However, the specification of faces is not limited to this, and at least one of the faces within a plurality of detected faces may be specified.

Moreover, in the above embodiment, the AF evaluation value, size of the face, color of the face and inclination of the face are exemplified as the evaluation standards for specification of the standard face in the standard face specifying process. However, the evaluation standards are not limited to this, and any standard may be applied as long as the standard face can be specified in the standard face specifying process. For example, degree of matching with the face feature information according to the specification of the face parts in the face detection process may be adopted as the evaluation standard.

Further, in the above embodiment, detection of a plurality of faces is carried out by evaluating the faces based on any one of the evaluation standard among a plurality of evaluation standards. However, the evaluation is not limited to this, and for example, each of the faces may be evaluated based on different evaluation standards. That is, after evaluating and detecting any one of the faces among a plurality of faces based on a predetermined evaluation standard, the evaluation standard may be changed to evaluate and detect another face.

At this time, the face detection frame A to be superimposed and displayed on the face which is detected by changing the evaluation standard may be formed in a different form according to the evaluation standard. In such way, the evaluation standard for the detection of each of the faces can be easily known even when a plurality of faces are detected based on a plurality of evaluation standards.

Furthermore, in the above embodiment, the face detection frame A formed in an approximately rectangular shape is shown as an example. However, the form of the frame is not limited to this, and the frame may be formed in any form as long as the frame can be corresponded to the face.

Moreover, the structure of the image pickup apparatuses 100 and 200 described in the above embodiments are examples, and the structure is not limited to the above.

Further, the center area R1, the upper area R2, the lower area R3, the left area R4 and the right area R5 which are formed by dividing the image frame G in five are exemplified as a plurality of areas which are to be candidates for the targeted area R. However, the number in which the image frame G is to be divided and positions and sizes of each of the divided areas are not limited to the example. The number in which the image frame G is divided can be arbitrarily changed as long as the image frame G is to be divided in more or equal to two However, size of the targeted area for the face detection can be made to be small by increasing the number of targeted area R. Therefore, speed of the face detection can be made to be faster and the detection of the desired face can be carried out more promptly.

Furthermore, a group picture of 13 persons is exemplified as the subject. However, the number of persons may be more than 13 or smaller than 13.

Moreover, every time a face is newly detected in the face detection process, the face is added and is identified and displayed by having the face detection frame A superimposed and displayed on the newly detected face. However, the identification display of the newly detected face is not limited to this, and the newly added face may be identified arid displayed instead of the face which is already identified and displayed. That is, as the switching identification display control unit, the CPU 71 may make the image display section 32 carry out the identification display of the newly detected face by switching the face which is already identified and displayed to the face which is newly detected in the face detection process. In such way, the face to be the standard in the automatic focus process and the automatic exposure process can be known more easily.

Here, selecting whether to add the face which is to be newly identified and displayed or to switch to the face which is to be newly identified and displayed may be set based on a predetermined operation of the operation section 4 by a user in advance Further, the selection of whether to add the newly detected face to the one or plurality of faces which is already detected or to switch the face which is already selected to the newly detected face can be carried out according to the length of time the button is being operated without the button being released when the cursor button c2, c3, c4 or c5 or the set button c1 is pressed during the through image.

In addition, in the above embodiment, the functions of the face detection unit, the detection unit, the targeted area setting unit, the first switching unit, the face specifying unit, the second switching unit, the execution control unit, the change control unit, the condition changing unit, the evaluation unit, the threshold resetting unit, the photographing mode setting unit, the evaluation standard switching setting unit, the switching identification display control unit, the adding identification display control unit and the image pickup related process executing unit are realized by the CPU 71 executing the predetermined programs and the like. However, the structure is not limited to this, and for example, the realization of the above functions may be structure by the logic circuit or the like for realizing various types of functions.

Further, in the above embodiment, a person's face is made to be the subject to be targeted for detection. In a normal photographing, a person is more important comparing to other subjects such as buildings, sceneries and the like in many cases and especially, it is important to photograph the face of the person in a good condition. Therefore, as described in the above embodiments, more improved achievement can be obtained by setting a person's face as the target for detection and by combining with the face detection process. However, in a case of a photographing scene where a subject other than a person's face is important, the important subject other than a person's face may be set as the target for detection. For example, when photographing an animal's face, it may be combined with a process for detecting an animal's face, and when photographing flowers, it may be combined with a process for detecting a flower.

The entire disclosure of Japanese Patent Application No. 2008-163934 filed on Jun. 24, 2008 including descriptions, claims, drawings, and abstracts are incorporated herein by reference in its entirety.

What is claimed is:

1. An image pickup apparatus having a function of detecting a specific subject, comprising:
    an image pickup unit;
    a display unit to display an image frame which is repeatedly picked up by the image pickup unit while sequentially updating the image frame;
    a detection unit to detect the specific subject in any of a plurality of areas into which the image frame is divided;
    an identification display unit to identify and display the specific subject which is detected by the detection unit in the image frame displayed by the display unit;
    an instruction operation unit to receive a plurality of instruction operations which are different from each other and which correspond respectively to the plurality of areas into which the image frame is divided;
    a first switching unit to switch an area which is to be a detection target for the detection unit to be an area corresponding to a received instruction operation when any of the instruction operations is received by the instruction operation unit; and
    a condition changing unit to orderly change a detection condition of the specific subject according to a number of times that the instruction operation is carried out without switching the area which is to be the detection target for the detection unit when a same instruction operation is continuously carried out by the instruction operation unit.

2. The image pickup apparatus according to claim 1, further comprising an evaluation unit to evaluate each specific subject in the image frame based on a predetermined evaluation standard and to calculate an evaluation value,
    wherein when a same instruction operation is continuously carried out by the instruction operation unit, the detection unit orderly detects the specific subjects in an order according to the evaluation value which is calculated by the evaluation unit.

3. The image pickup apparatus according to claim 2, wherein when the same instruction operation is continuously carried out by the instruction operation unit, the detection unit orderly detects the specific subjects in an order from the specific subject having a good evaluation value which is calculated by the evaluation unit.

4. The image pickup apparatus according to claim 2, wherein when the same instruction operation is continuously carried out by the instruction operation unit, the detection unit orderly detects the specific subjects in an order from the specific subject having a bad evaluation value which is calculated by the evaluation unit.

5. The image pickup apparatus according to claim 2, further comprising an evaluation standard assigning unit to assign a predetermined evaluation standard by which the evaluation value is calculated by the evaluation unit.

6. The image pickup apparatus according to claim 2, further comprising:
- a resetting instruction input unit to input a resetting instruction of a threshold of brightness for a detection by the detection unit; and
- a threshold resetting unit to orderly reset the threshold of brightness every time the resetting instruction is inputted by the resetting instruction input unit so that the specific subject is detected more easily by the detection unit.

7. The image pickup apparatus according to claim 6, further comprising a photographing mode setting unit to select and set any of photographing modes among a plurality of photographing modes in which a relation between a brightness of a specific subject portion and a background portion in the image frame is different,
- wherein the threshold resetting unit resets the threshold of brightness so as to change by a predetermined amount according to the photographing mode set by the photographing mode setting unit every time the resetting instruction is inputted by the resetting instruction input unit.

8. The image pickup apparatus according to claim 2, further comprising an evaluation standard switching setting unit to switch and set the evaluation standard for a detection by the detection unit among a plurality of evaluation standards to be evaluated by the evaluation unit according to the number of times the same instruction operation is continuously carried out by the instruction operation unit.

9. The image pickup apparatus according to claim 2, wherein when the identification display unit identifies and displays a face which is detected by the detection unit, the identification display unit carries out a display to identify the face based on which of a plurality of evaluation standards was used to identify the face.

10. A non-transitory computer-readable storage medium storing a program for an image pickup apparatus having a function of detecting a specific subject, the program being executable to control a computer of the image pickup apparatus to realize functions of units comprising:
- an image pickup unit;
- a display unit to display an image frame which is repeatedly picked up by the image pickup unit while sequentially updating the image frame;
- a detection unit to detect the specific subject in any of a plurality of areas into which the image frame is divided;
- an identification display unit to identify and display the specific subject which is detected by the detection unit in the image frame displayed by the display unit;
- an instruction operation unit to receive a plurality of instruction operations which are different from each other and which correspond respectively to the plurality of areas into which the image frame is divided;
- a first switching unit to switch an area which is to be a detection target for the detection unit to be an area corresponding to a received instruction operation when any of the instruction operations is received by the instruction operation unit; and
- a condition changing unit to orderly change a detection condition of the specific subject according to a number of times that the instruction operation is carried out without switching the area which is to be the detection target for the detection unit when a same instruction operation is continuously carried out by the instruction operation unit.

* * * * *